United States Patent
Pal et al.

(10) Patent No.: US 9,553,855 B2
(45) Date of Patent: Jan. 24, 2017

(54) STORING A KEY TO AN ENCRYPTED FILE IN KERNEL MEMORY

(71) Applicant: Red Hat, Inc., Raleigh, NC (US)

(72) Inventors: Dmitri Pal, Framingham, MA (US); Rob Crittenden, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 157 days.

(21) Appl. No.: 14/181,246

(22) Filed: Feb. 14, 2014

(65) Prior Publication Data

US 2015/0237025 A1 Aug. 20, 2015

(51) Int. Cl.
 *H04L 29/06* (2006.01)
 *G06F 21/00* (2013.01)
 *G06F 21/62* (2013.01)

(52) U.S. Cl.
 CPC .......... *H04L 63/06* (2013.01); *G06F 21/6209* (2013.01); *H04L 63/08* (2013.01); *H04L 63/102* (2013.01)

(58) Field of Classification Search
 CPC .......... H04L 63/06; H04L 63/10; H04L 63/08; G06F 21/6209
 See application file for complete search history.

(56) References Cited

U.S. PATENT DOCUMENTS

| | | | |
|---|---|---|---|
| 7,613,915 B2 | 11/2009 | Srinivasan et al. | |
| 7,991,999 B2 | 8/2011 | Princen et al. | |
| 8,200,961 B2 | 6/2012 | Srinivasan et al. | |
| 8,261,068 B1* | 9/2012 | Raizen | G06F 21/6218 713/164 |
| 8,494,170 B2 | 7/2013 | Kahler et al. | |
| 8,667,267 B1* | 3/2014 | Garcia | H04L 63/0869 380/202 |
| 8,996,671 B1* | 3/2015 | Horan | H04L 12/569 709/223 |
| 2003/0126434 A1 | 7/2003 | Lim et al. | |
| 2003/0200217 A1* | 10/2003 | Ackerman | G06F 21/32 |
| 2005/0223080 A1* | 10/2005 | Gray | H04L 67/34 709/213 |
| 2007/0006322 A1* | 1/2007 | Karimzadeh | G06F 19/323 726/27 |
| 2007/0022471 A1* | 1/2007 | Bodepudi | G06F 21/6218 726/5 |

(Continued)

OTHER PUBLICATIONS

"What is the difference between kernel space and the user space?" http://stackoverflow.com/questions/5957570/what-is-the-difference-between-the-kernel-space-and-the-user-space, pp. 1-4, Mar. 26, 2012.*

(Continued)

*Primary Examiner* — Lisa Lewis
(74) *Attorney, Agent, or Firm* — Lowenstein Sandler LLP (57) ABSTRACT

Storing a key to an encrypted file in a kernel memory is disclosed. Authentication data may be received and authentication credentials of the authentication data may be stored in a file. The file may be encrypted and a key to the encrypted file may be generated. The encrypted file may be stored in a user space and the key may be stored in a kernel space. The key may be retrieved from the kernel space and applied to the encrypted file in the user space to decode the encrypted file and subsequently access the authentication credentials stored in the encrypted file.

20 Claims, 6 Drawing Sheets

(56) References Cited

U.S. PATENT DOCUMENTS

| | | | | |
|---|---|---|---|---|
| 2010/0095130 A1* | 4/2010 | Bertran | ............... | G07F 7/1008 |
| | | | | 713/189 |
| 2010/0250937 A1* | 9/2010 | Blomquist | ............... | H04L 9/14 |
| | | | | 713/170 |
| 2011/0083017 A1* | 4/2011 | Ali | ............... | G06F 21/34 |
| | | | | 713/185 |
| 2013/0160145 A1* | 6/2013 | Henzie | ............... | G06F 21/10 |
| | | | | 726/29 |
| 2013/0254533 A1* | 9/2013 | Welch | ............... | G06F 21/32 |
| | | | | 713/155 |
| 2013/0269018 A1* | 10/2013 | Dingwall | ............... | G06F 21/34 |
| | | | | 726/8 |

OTHER PUBLICATIONS

"Backup up the Encryption Key Manager," Retrieved on Sep. 3, 2013, http://pic.dhe.ibm.com/infocenter/iseries/v7r1m0/index.jsp?topic=%2Frzarm%2Frzarmencryptrestoreekm.htm.

"Encrypted File System (EFS) on AIX," Published Apr. 4, 2013, http://blog.kerrneltech.com/2013/04/encrypted-file-system-efs-on-aix.html.

Vellal, "A Device Mapper based Encryption Layer for TransCrypt," Published Jun. 2008, http://www.cse.iitk.ac.in/users/moona/students/Y6111039.pdf/.

Elenkov, "Credential Storage Enhancements in Android 4.3," Retrieved on Sep. 3, 2013, http://nelenkov.blogspot.in/.

* cited by examiner

STORING A KEY TO AN ENCRYPTED FILE IN KERNEL MEMORY

TECHNICAL FIELD

Aspects of the disclosure relate generally to encryption keys and, more specifically, relate to storing a key to an encrypted file in kernel memory.

BACKGROUND

Network or cloud computing platforms may provide a complex online infrastructure with many resources. Users may utilize certain resources of the complex online infrastructure at different times. For example, a particular user may seek to access a first server or service of the online infrastructure and later seek to access a second server or service of the online infrastructure. Each time that the user accesses a different server or service, the user may be asked to present authentication information to the server or service. For example, the user may need to enter a password, provide an authentication token, or other such information that may identify the user each time that the user is accessing a different server or service of the online infrastructure.

Certain network or cloud computing platforms may provide a user with an authentication token that may be used by the user for accessing various resources of the network or cloud computing platform. The authentication token may be stored in a client system currently used by the user.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure store a key to an encrypted file in a kernel keyring of a kernel memory. An online infrastructure may provide services and/or servers to be accessed by one or more users. Such services and servers provided by an online infrastructure may be referred to as resources of the online infrastructure. Each user may be associated with permissions that define which services and servers a user is authorized to access. Such permissions may be referred to as authentication credentials. As a user accesses the services and servers of the online infrastructure, the user may be required to present authentication credentials to separate services and servers at different times. For example, the user may transmit authentication credentials to access a first service or server at a first time and later may be required to transmit authentication credentials again if the user is accessing a second service or server at a second time.

Certain online infrastructure systems may transmit authentication credentials to a user in response to a log in. For example, a user may utilize and log in to a client system associated with the online infrastructure. The user may provide authentication information (e.g., a user name and password or other such credentials such as a one time password, certificate, biometric proof of identity, etc.) when logging in to the client system and may receive authentication credentials from the online infrastructure. The authentication credentials may also include the permissions of a user to interact with the various services and servers of the online infrastructure. The received authentication credentials may be stored in the client system. For example, the authentication credentials may be stored in the file system or user space of the client system.

The client system may include an additional layer of security by using a storage location such as the kernel keyring in the kernel space or kernel memory. The kernel memory may only be accessible by a kernel associated with the client system and thus only accessible by the user who has logged in to the client system. A key store or keyring of the kernel memory may be used to store data associated with the user. For example, a kernel keyring may be a portion or section of the kernel memory that may store a key or other information or data that is only accessible by a process or a user that is associated with the process (e.g., an owner of the process). In some embodiments, the kernel keyring may be split into portions or sections such that each portion or section is dedicated to a specific user. However, the keyring of the kernel memory is typically limited in size. The authentication credentials may be of a large size as it may contain many different permissions for many different services and servers of the online infrastructure in addition to the proof of identity of a user. As such, the keyring of the kernel memory may not be capable of storing the authentication credentials.

A solution to provide an additional layer of security when storing authentication credentials may be to secure a file containing the authentication credentials with a password protection scheme. For example, a user may enter a password to access the contents of a password protected file that includes the authentication credentials. However, as the user of the client system may access different services and servers of the online infrastructure at different times, the user may be continually prompted to enter the password to the password protected file for each service and server.

In order to address the above referenced problem with regard to providing an additional layer of security when storing the authentication credentials without continuously requiring a user entered password, a key and an encrypted file may be used to present authentication credentials from the user of the client system to services or servers of the online infrastructure. For example, in response to a user log in from a client system, the online infrastructure may transmit authentication data to the client system. In response to receiving the authentication data, the client system may generate a file that includes authentication credentials. The client may further encrypt the file and generate a key to the encrypted file. The contents stored in the encrypted file may include the authentication credentials that a user may present to the services and servers of the online infrastructure. The encrypted file may be stored in the file system or user space of the client system and the key may be stored in the keyring of the kernel space or kernel memory. As the client system accesses the encrypted file in the file system or user space, the key from the keyring of the kernel space or kernel memory may automatically be retrieved to decrypt or decode the encrypted file to access the authentication credentials which may subsequently be presented to the services and servers of the online infrastructure.

Figure 1:
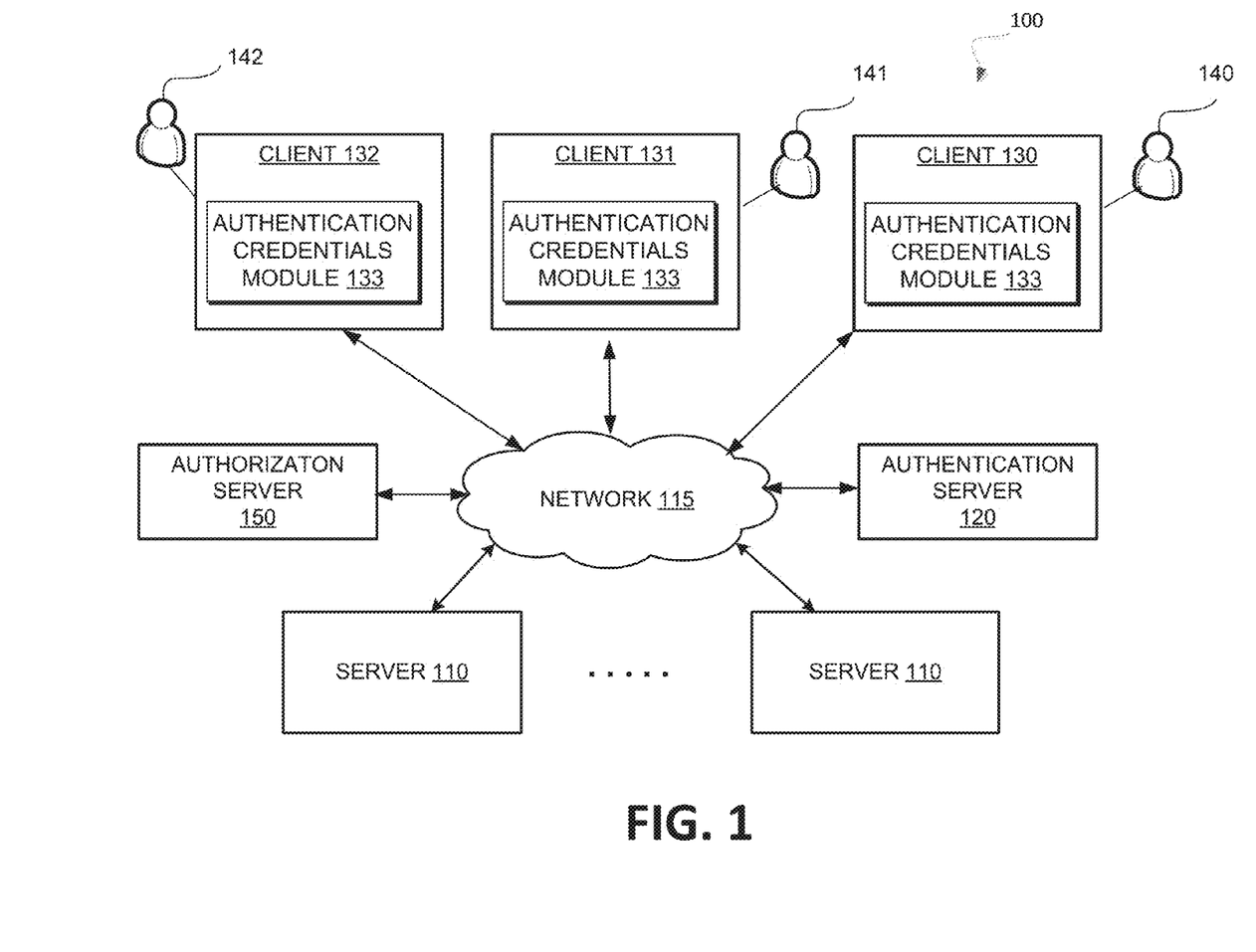
FIG. 1 illustrates an example system architecture in which embodiments of the disclosure may operate.

FIG. 1 is a block diagram of an embodiment of a system architecture 100 in which some embodiments of the present disclosure may operate. The system architecture 100 may include servers 110 coupled to client systems 130, 131, and 132 over a network 115. Users 140, 141, and 142 may log in to the client systems to access the servers 110. The client systems 130, 131, and 132 and servers 110 may be a computing device such as a desktop computer or a laptop computer, or a portable computing device such as, but not limited to, mobile telephones, personal digital assistants (PDAs), portable media players, netbooks, tablet computers, portable gaming consoles, portable televisions, electronic book readers, and the like. The network 115 may be a private network (e.g., a local area network (LAN), a wide area network (WAN), intranet, etc.), a public network, a wireless network, a cellular network, or a combination thereof.

The servers 110 may be server computers that are part of an online infrastructure system. Examples of an online infrastructure include a cloud computing platform that may allow multiple users from multiple client systems to access different components or resources of the cloud computing platform. The online infrastructure may provide physical or virtual resources, such as access to services, servers, or other such resources, to client systems that have provided authentication information (e.g., a user name and password) to the online infrastructure. Examples of services provided by the online infrastructure may include, but are not limited to, access to data stored on storage devices, virtual machines, software services, physical servers, etc.

In some embodiments, an authentication server 120 of the online infrastructure may manage authentication information from the client systems 130, 131, and/or 132. For example, the authentication server 120 may authenticate user passwords for corresponding user names and/or transmit authentication data to the client system. For example, in response to authenticating a client system log in, the authentication server 120 may generate and/or transmit authentication data to the client system. In some embodiments, a client system may receive the authentication data and generate a file corresponding to authentication credentials based on the authentication data. The client system may encrypt the file and generate a key for the encrypted file. The authentication credentials in the encrypted file may include information specifying permissions that define which resources of the online infrastructure system that the user of the client system may access. The resources of the online infrastructure system may determine the manner in which the user of the client system may access the resources based on the identity of the user from the authentication credentials and additional data that may be included in the authentication data.

The system architecture 100 may further include an authorization server 150. In some embodiments, a client system may transmit authentication credentials from the encrypted file stored at the client system to the authorization server to be granted access to the servers 110. In alternative embodiments, the functionality of the authorization server 150 and the authentication server 120 may be performed by a single server that provides both authorization and authentication functions for the system architecture 100.

Each of the client systems 130, 131, and 131 may include an authentication credentials module 133 to manage the authentication credentials that are generated based on the authentication data received from the authentication server 120 and to present or transmit corresponding authentication credentials to particular resources (e.g., servers 110) or authorization server 150 of the online infrastructure.

As such, an online infrastructure may provide multiple resources that may be accessed by multiple client systems. In response to a client system log in, authentication information of a user may be verified and, if the user is successfully verified, authentication data may be transmitted to the client system. In some embodiments, the client system may generate authentication credentials based on the authentication data. The authentication credentials may specify access permissions of the user of the client system for various resources of the online infrastructure. The authentication credentials may be subsequently transmitted to the resources of the online infrastructure.

Figure 2:
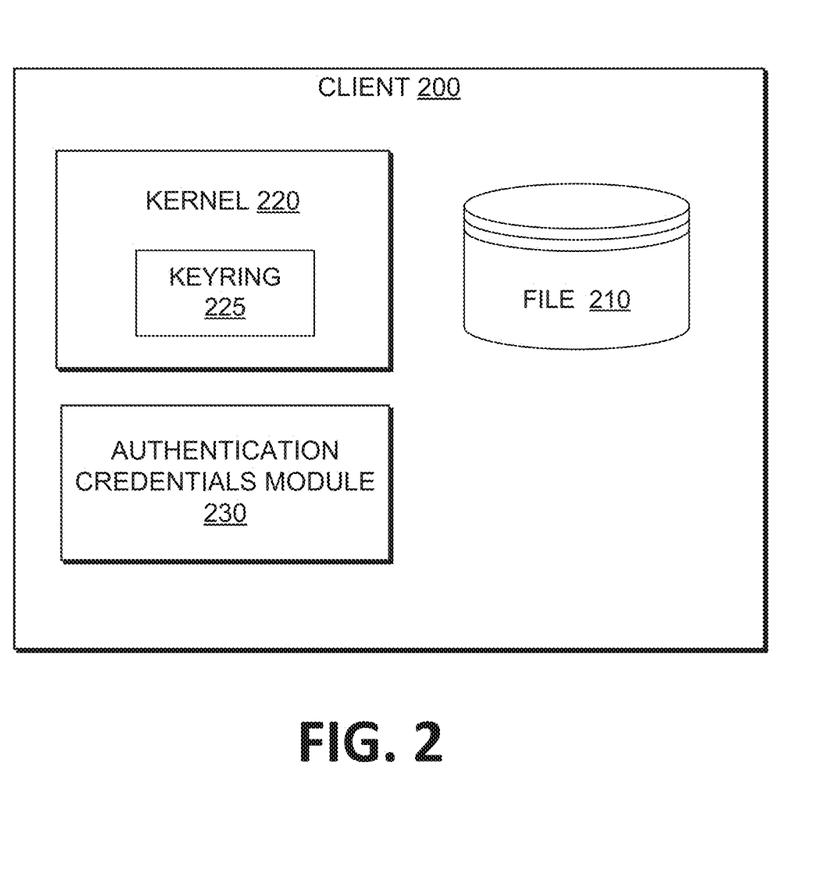
FIG. 2 illustrates an example client system in accordance with some embodiments of the disclosure.

FIG. 2 illustrates an example client system 200 in accordance with some embodiments of the disclosure. The client system 200 may correspond to each of the client systems 130, 131, and 132. In general, a user may log in to the client system 200 to access one or more resources of an online infrastructure.

As shown in FIG. 2, the client system 200 may include a kernel 220, file system 210, and an authentication credentials module 230. In some embodiments, the authentication credentials module 230 may transmit authentication information (e.g., a user name and password) of a user who has logged in to the client system 200 and may receive authentication data from an online infrastructure in response to a verification of the authentication information. The client 200 may further generate authentication credentials based on the authentication data and store the authentication credentials in a file. In some embodiments, the file storing the authentication credentials may be encrypted by the client 200 and a key to the encrypted file may be generated by the client 200. The encrypted file may be stored in the file system 210 which may also be referred to as user space. The key may be stored in a keyring 225 associated with the kernel 220. The keyring 225 may also be referred to as a portion or section of the kernel space or kernel memory. Further details with regard to the encrypted file, key, and the authentication credentials module 230 are disclosed with regard to FIGS. 3-5.

The client system 200 may include physical memory (e.g., a main memory) that is mapped to virtual memory. In some embodiments, an operating system of the client system 200 may separate the virtual memory into regions such as a user space (e.g., the file system 210) and a kernel space or kernel memory (including the keyring 225). The user space may be reserved for user mode programs such as application software and libraries that an operating system may use to interact with the kernel 220. Such libraries may manipulate or access files stored in the user space or file system 210. In contrast, the kernel space or kernel memory may run an operating system (e.g., Linux™ OS, Windows™ OS, etc.) associated with the kernel 220 that may act as an interface between applications using the user space and the underlying computing hardware of the client system 200. For example, the kernel 220 may provide file management services for the client system 200 by providing memory access services to applications to access the underlying physical memory from which the virtual user space or file system 210 is mapped. The kernel space or kernel memory may be reserved for the kernel 220, kernel extensions, and device drivers to the underlying hardware of the client system 200. As the kernel space or kernel memory is reserved for the kernel 220, applications that run in the user space may not access the kernel space or kernel memory and, as such, may not access the keyring 225 of the kernel 220 as only a corresponding user or owner of a process may access the keyring 225.

As such, the client system 200 may include a user space corresponding to a file system 210 and a kernel space or kernel memory including a keyring 225. Applications executed on the client system 200 may access files stored in the user space. For example, the applications may access files stored in the file system 210. However, the applications do not have access permissions to access all files or data stored in the kernel space or kernel memory. Accordingly, as the keyring 225 is a part of the kernel space or kernel memory, applications may not be capable of accessing the keyring 225. In contrast, the kernel 220 may access the keyring 225. For example, only a user corresponding to an assigned portion of the keyring 225 may access the assigned portion of the keyring 225.

In some embodiments, the keyring 225 (also referred to as a key store) may be a portion of the kernel space or kernel memory that contains data associated with a user. For example, when a user logs in to the client system 200, the keyring 225 may be used to store data associated with the user. In some embodiments, the information stored in the keyring 225 may be stored in response to a user log in to the client system and/or a user log in to the online infrastructure from the client system. When the user logs off of the client system 200, the key store 225 may automatically be deleted. As such, the keyring 225 may contain ephemeral or temporary data associated with a user that is stored when a user initially logs in to the client system 200 to the online infrastructure and is deleted as the user logs out of the client system 200 to the online infrastructure. Thus, the keyring 225 may be a portion of the kernel memory or kernel space that stores temporary user identification information when the user logs in to the client system 200.

Although FIG. 2 shows the authentication credentials module 230 as not being part of the kernel 220, in some embodiments, the authentication credentials module 230 may be implemented within the kernel 220 and/or an operating system of the client system 200. Further details with regard to the authentication credentials module 230 are disclosed with regard to FIG. 3.

As such, the client system 200 may include an authentication credentials module 230, a kernel keyring 225 in kernel space or kernel memory, and a file system 210 that corresponds to user space. As previously discussed, the authentication credentials module 230 may encrypt a file and generate a key to the encrypted file. The encrypted file may be stored in the file system 210 of the user space and the key to the encrypted file may be stored in the keyring 225 of the kernel space or kernel memory. Since the kernel space or kernel memory is only accessible by the kernel 220, the key to the encrypted file stored in the keyring 225 is stored with an additional layer of security as other applications running on the client system 220 do not have permissions to access the kernel space or kernel memory and only a user or owner of a process that corresponds to a particular section or portion of the keyring may access the same section or portion.

Figure 3:
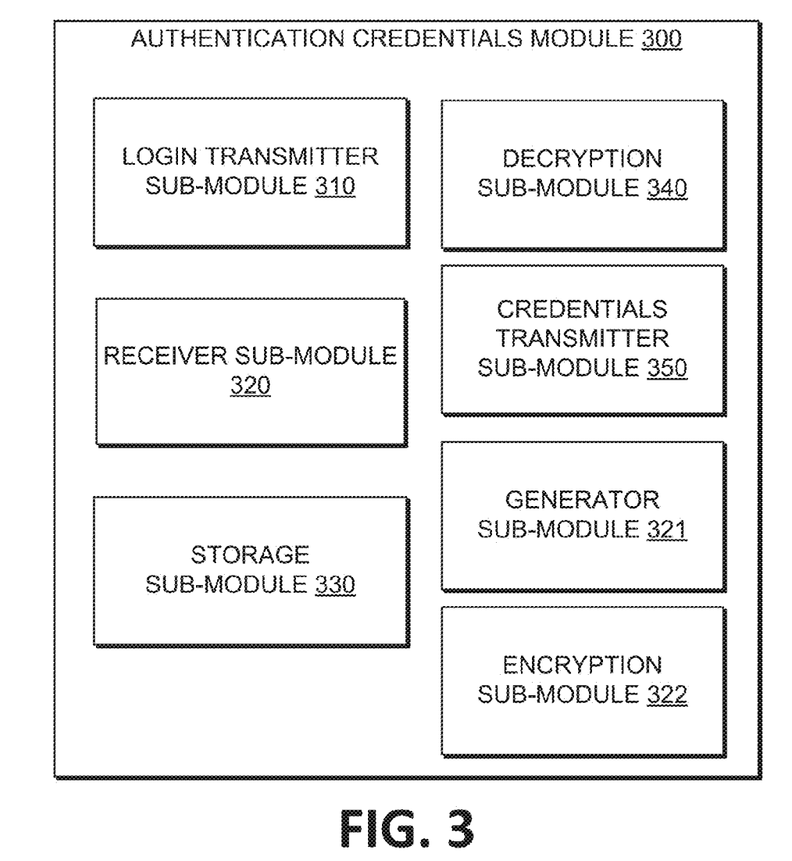
FIG. 3 is a block diagram of an example authentication credentials module in accordance with some embodiments of the disclosure.

FIG. 3 is a block diagram of an example authentication credentials module 300 in accordance with some embodiments of the disclosure. In general, the authentication credentials module 300 may correspond to the authentication credentials module 230 of FIG. 2. The authentication credentials module 300 may include a login transmitter sub-module 310, a receiver sub-module 320, a generator sub-module 321, an encryption sub-module 322, a storage sub-module 330, a decryption sub-module 340, and a credentials transmitter sub-module 350. In alternative embodiments, the functionality of one or more of the sub-modules may be combined or divided.

As shown in FIG. 3, the authentication credentials module 300 may include a login transmitter sub-module 310. In some embodiments, the login transmitter sub-module 310 may transmit user authentication information from a client system to an authentication server of an online infrastructure. For example, a user may log in to the client system and provide a user name and password or other such credentials. The login transmitter sub-module 310 may transmit the user name and password or other authentication information to the authentication server.

The authentication credentials module 300 may include a receiver sub-module 320. In some embodiments, the receiver sub-module 320 may receive authentication data from an authentication server of an online infrastructure in response to a verification of authentication information transmitted by the login transmitter sub-module 310. The generator sub-module 321 may generate a file based on the authentication data that has been received by the receiver sub-module 320. For example, the generated file may include authentication credentials based on the authentication data. The encryption sub-module 322 may further encrypt the file including the authentication credentials generated by the generator sub-module 321. For example, the encryption sub-module 322 may generate an encrypted file including the authentication credentials and a key to the encrypted file. Furthermore, the storage sub-module 330 of the authentication credentials module 300 may store the encrypted file generated by the encryption sub-module 322 in a user space (e.g., file system 210) and may further store the key to the encrypted file in a keyring of the kernel space or kernel memory (e.g., keyring 225).

As shown in FIG. 3, the authentication credentials module 300 may include a decryption sub-module 340. In some embodiments, the decryption sub-module 340 may retrieve the encrypted file stored in the file system of the user space and the key to the encrypted file stored in the keyring of the kernel space or kernel memory. Furthermore, the decryption sub-module 340 may decrypt or decode the encrypted file with the key. The transmitter sub-module 350 may subsequently transmit all or a portion of the contents of the encrypted file to a resource (e.g., a server or service) or an authorization server of an online infrastructure.

Figure 4:
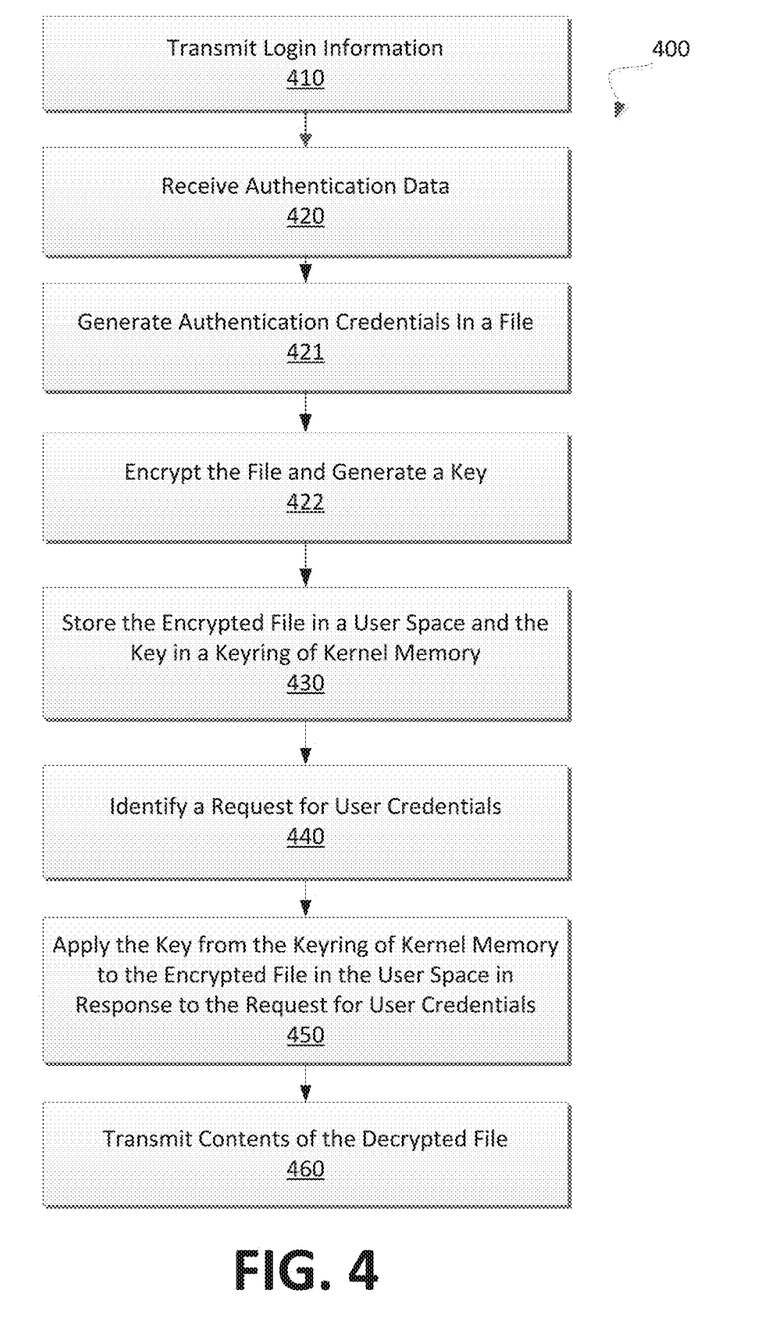
FIG. 4 is a flow diagram of an example method to apply a key stored in a kernel space to an encrypted file stored in a user space in accordance with some embodiments of the disclosure.

FIG. 4 is a flow diagram of an example method 400 to apply a key stored in a keyring of a kernel space or kernel memory to an encrypted file stored in a user space. The method 400 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 400 may be performed by an authentication credentials module 230 or 300 of a client system.

As shown, the method 400 may begin by the processing logic transmitting login information (block 410). In some embodiments, the processing logic may transmit the login information in response to a user request of a client system to access an online infrastructure. The processing logic may further receive authentication data (block 420). For example, the authentication data may be received from an authentication server of the online infrastructure after verification of the login information. In response to receiving the authentication data, the processing logic may generate authentication credentials based on the authentication data and may store the authentication credentials in a file (block 421). Furthermore, the processing logic may encrypt the file including the authentication credentials and generate a key to the encrypted file (block 422). Furthermore, the processing logic may store the encrypted file in user space (e.g., file system 210) and may store the key to the encrypted file in the keyring of the kernel space or kernel memory (e.g., keyring 225 of the kernel 220). In some embodiments, the processing logic may identify a request for a user authentication credential (block 440). For example, a user of the client system may request to access a resource of the online infrastructure. In response to the user request, the resource or authorization server of the online infrastructure may request that the user present authentication credentials that indicates that the user is allowed to access the resource and may be used to identify the user to further indicate the manner in which the user may access the resource. In response to the request for the user to present the authentication credentials, the processing logic may retrieve and apply the key from the keyring of the kernel space or kernel memory to the encrypted file stored in the user space (block 450). In some embodiments, the application of the key to the encrypted file is automatically performed by the processing logic without any user intervention.

In some embodiments, the encrypted file is an encoded file that contains information or content that cannot be read without the key to the encrypted file. For example, in an encryption scheme, information is encrypted by using an encryption algorithm, effectively turning the information or content into unreadable data. The encryption algorithm utilizes an encryption key to specify how the information or content is to be encoded. The encrypted file may be decoded by utilizing a corresponding decryption key. Once the decryption key is applied to the encrypted file, the information or contents contained in the encrypted file may be accessible and read. As such, the processing logic may decode the encrypted file by applying the key from the keyring of the kernel space or kernel memory to the encrypted file stored in the user space.

Returning to FIG. 4, the processing logic may transmit information or contents stored in the encrypted file after the key has been applied to the encrypted file (block 460). In some embodiments, the encrypted file may include multiple authentication credentials for multiple resources of the online infrastructure. The processing logic may identify the specific authentication credentials within the encrypted file for the resource of the online infrastructure requesting the user authentication credential and may subsequently transmit the specific authentication credentials to the resource. For example, the contents of the encrypted file may include a first authentication credential corresponding to a first resource and a second authentication credential corresponding to a second resource. The user of the client system may attempt to access the first resource. In response, the first resource or an authorization server may request that the user present the first authentication credential. The encrypted file may then be decoded and the first authentication credential may be selected from the now decoded contents stored in the encrypted file and the first authentication credential may then be transmitted to the first resource or the authorization server. As such, a first portion of the contents stored in the encrypted file may be transmitted, but a second portion of the contents stored in the encrypted file may not be transmitted to the resource or the authorization server. Alternatively, the processing logic may transmit all of the information or contents stored in the encrypted file to the resource or authorization server of the online infrastructure that the user is seeking to access.

As such, a user may log in with a client system associated with an online infrastructure. The client system may receive authentication data and generate a file including authentication credentials based on the authentication data. The file including the authentication credentials may then be encrypted and a key to the encrypted file may be generated. The encrypted file may be stored in a first location corresponding to user space and the key may be stored in a second location corresponding to a keyring of the kernel space or kernel memory. The first location and the second location may be associated with different access permissions. For example, certain applications may be able to access files or data stored in the first location but may not have access permission to access files or data stored in the second location. In some embodiments, the applications that do not have access permission may be applications that are not associated with a local user account. The user of the client system may attempt to access a resource of the online infrastructure and receive a request for user authentication credentials. In response to the request, the key may be retrieved from the second location and be used to decode the encrypted file in the first location. Contents or information in the encrypted file may subsequently be accessed and transmitted as the requested user authentication credentials.

Figure 5:
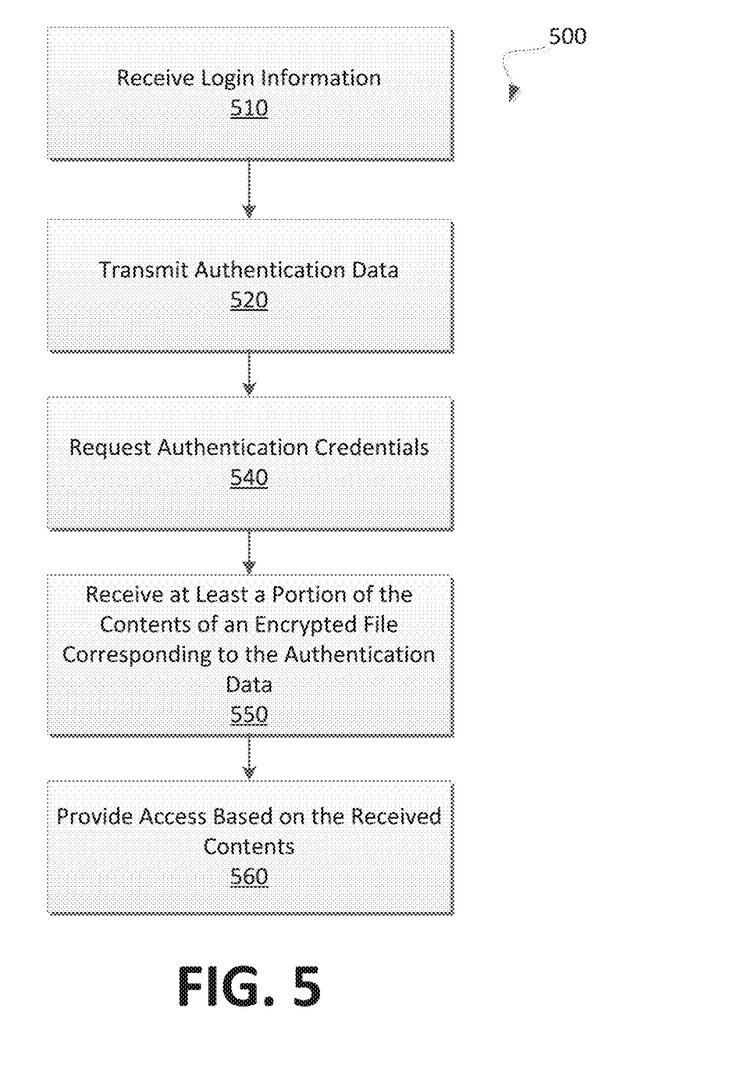
FIG. 5 is a flow diagram of an example method to transmit authentication data to a client system in accordance with some embodiments.

FIG. 5 is a flow diagram of an example method 500 to transmit authentication data for the generation of a key and encrypted file by a client system. The method 500 may be performed by processing logic that may comprise hardware (e.g., processing device, circuitry, dedicated logic, programmable logic, microcode, etc.), software (e.g., instructions run on a processing device), or a combination thereof. In some embodiments, the method 500 may be performed by an authentication server 120, authorization server, server 110, or another resource or combination of resources or servers of an online infrastructure.

As shown in FIG. 5, the method 500 may begin with the processing logic receiving login information (block 510). For example, the processing logic may receive login information of a user from a client system connecting to one or more resources of the online infrastructure. The processing logic may verify the user login information and, if verified, may further transmit authentication data to the client system (block 520). In some embodiments, the client system may then generate an encrypted file based on the authentication data and a key to the encrypted file. The processing logic may further request authentication credentials (block 540). For example, a client system corresponding to the received login information may request access to a resource of the online infrastructure. In response to the request to access the resource from the client system, an authorization server or the requested resource itself may transmit a request for authentication credentials of the user that specify that the user of the client system has access permissions to the resource. The processing logic may further receive at least a portion of the contents or information stored in the encrypted file that was generated by the client system based on the authentication data (block 550). For example, a portion of the contents or information stored in the encrypted file that corresponds to a user of the client system's access permissions of the resource may be received. The processing logic may provide access to the resource to the user of the client system based on the received portion of the contents or information stored in the encrypted file that was earlier generated based on the transmitted authentication data.

Figure 6:
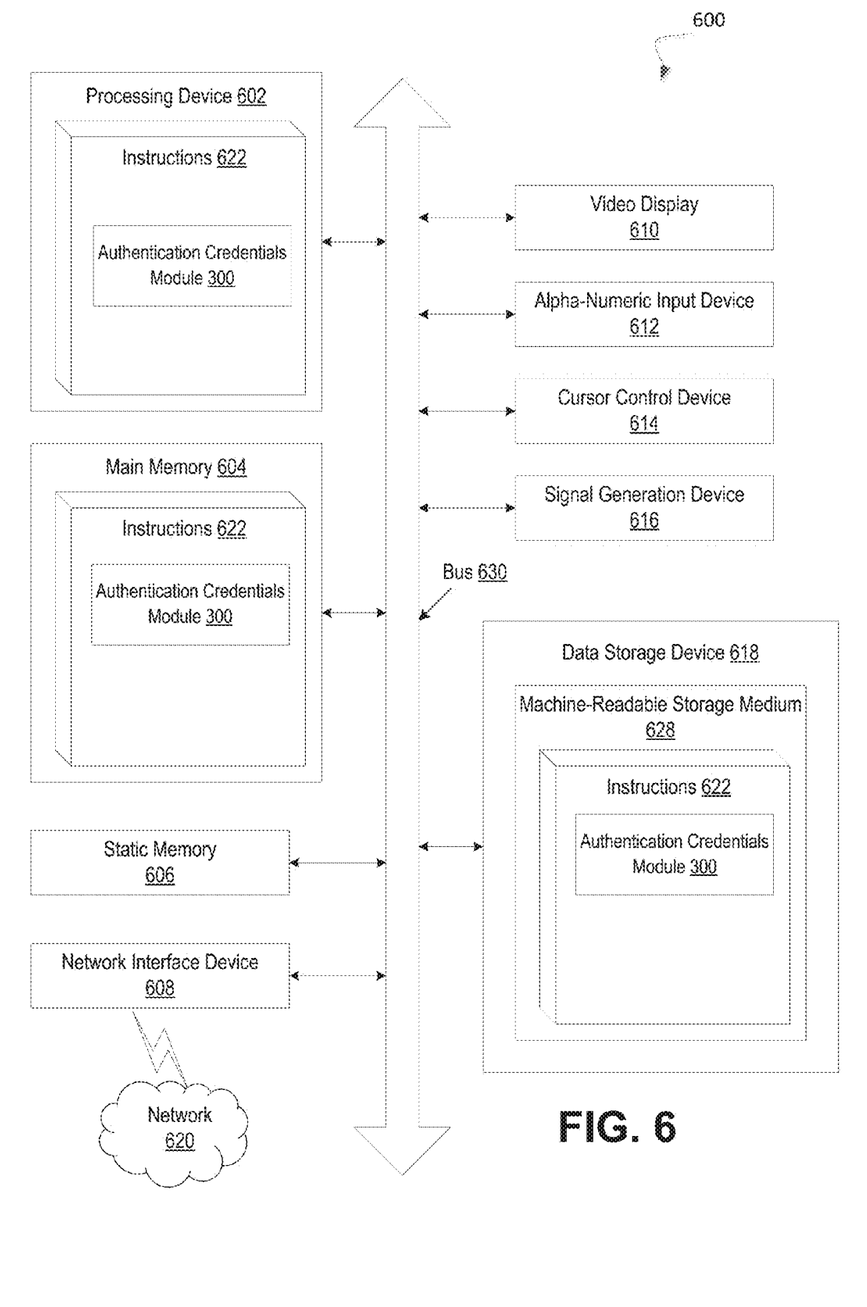
FIG. 6 illustrates a block diagram of an embodiment of a computer system in which some embodiments of the disclosure may operate.

FIG. 6 illustrates a block diagram of a machine in an example embodiment of a computer system 600 in which some embodiments of the disclosure may operate. In some embodiments, the computer system 600 or machine may contain a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored software embodying any one or more of the methodologies of functions described herein. The software may also reside, completely or at least partially, within the main memory 604 as instructions 622 and/or within the processing device 602 as processing logic during execution thereof by the computer system 600; the main memory 604 and the processing device 602 also constituting machine-accessible storage media.

The machine-readable storage medium 628 may also be used to store instructions 622 to implement an authentication credentials module 300 to store a key to an encrypted file in a kernel memory or kernel storage as described with respect to FIG. 2, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "accessing", "parsing", "locating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   receiving authentication data in response to a verification of a login to a network comprising a plurality of resources;
   generating an encrypted file comprising a plurality of authentication credentials corresponding to the resources of the network in view of the authentication data received in response to the verification of the login to the network;
   generating a key to the encrypted file;
   storing the encrypted file in a user space;
   storing the key in a portion of a kernel space assigned to the login to the network;
   in response to an access of the encrypted file, decoding, by a processing device, the encrypted file in the user space with the key in the kernel space to access the authentication credentials stored in the encrypted file; and
   deleting the key in the portion of the kernel space that is assigned to the login in response to a log off from the network.

2. The method of claim 1, wherein the plurality of authentication credentials specify a proof of identity for a user or access permissions for the user to access the resources of the network.

3. The method of claim 2, further comprising:
   transmitting, after decoding the encrypted file, a first authentication credential of the plurality of authentication credentials to access a first resource of the resources.

4. The method of claim 3, wherein the access of the encrypted file is in response to a request for user authentication credentials from the first resource, and wherein a subsequent access of the same encrypted file is in response to a request for user authentication credentials from a second resource of the plurality of resources of the network, the method further comprising:
   identifying, from the plurality of authentication credentials, a second authentication credential from the plurality of authentication credentials that corresponds to the second resource; and
   transmitting the second authentication credential of the plurality of authentication credentials to access the second resource.

5. The method of claim 1, further comprising:
   transmitting authentication information identifying a user to an authentication server, wherein the authentication data is received from the authentication server in response to a verification of the authentication information.

6. The method of claim 1, wherein the key is stored in a keyring of the kernel space, the keyring comprising information received in response to a user login.

7. The method of claim 1, wherein an operating system is associated with the kernel space and one or more applications are stored in the user space, and wherein applications in the user space that are not associated with a local user account do not have access permissions to the kernel space and the operating system has access permissions to the kernel space and the user space.

8. A system comprising:
   a memory to store an encrypted file; and
   a processing device, operatively coupled with the memory, to:
      receive authentication data in response to a verification of a login to a network comprising a plurality of resources;
      generate the encrypted file comprising a plurality of authentication credentials corresponding to the resources of the network in view of the authentication data received in response to the verification of the login to the network;
      generate a key to the encrypted file;
      store the encrypted file in a user space;
      store the key in a portion of a kernel space assigned to the login to the network;
      in response to an access of the encrypted file, decode the encrypted file in the user space with the key in the kernel space to access the authentication credentials stored in the encrypted file; and
      delete the key in the portion of the kernel space that is assigned to the login in response to a log off from the network.

9. The system of claim 8, wherein the plurality of authentication credentials specify a proof of identity for a user or access permissions for the user to access the resources of the network.

10. The system of claim 9, the processing device is further to:
    transmit, after decoding the encrypted file, a first authentication credential of the plurality of authentication credentials to access a first resource of the resources.

11. The system of claim 10, wherein the access of the encrypted file is in response to a request for user authentication credentials from the first resource, and wherein a subsequent access of the same encrypted file is in response to a request for user authentication credentials from a second resource of the plurality of resources of the network, the processing device is further to:
- identify, from the plurality of authentication credentials, a second authentication credential from the plurality of authentication credentials that corresponds to the second resource; and
- transmit the second authentication credential of the plurality of authentication credentials to access the second resource.

12. The system of claim 8, the processing device is further to:
- transmit authentication information identifying a user to an authentication server, wherein the authentication data is received from the authentication server in response to a verification of the authentication information.

13. The system of claim 8, wherein the key is stored in a keyring of the kernel space, the keyring comprising information received in response to a user login.

14. The system of claim 8, wherein an operating system is associated with the kernel space and one or more applications are stored in the user space, and wherein applications in the user space that are not associated with a local user account do not have access permissions to the kernel space and the operating system has access permissions to the kernel space and the user space.

15. A non-transitory machine-readable storage medium comprising instructions that, when accessed by a processing device, cause the processing device to:
- receive authentication data in response to a verification of a login to a network comprising a plurality of resources;
- generate an encrypted file comprising a plurality of authentication credentials corresponding to the resources of the network in view of the authentication data received in response to the verification of the login to the network;
- generate a key to the encrypted file;
- store the encrypted file in a user space;
- store the key in a portion of a kernel space assigned to the login to the network;
- in response to an access of the encrypted file, decode, by the processing device, the encrypted file in the user space with the key in the kernel space to access the authentication credentials stored in the encrypted file; and
- delete the key in the portion of the kernel space that is assigned to the login in response to a log off from the network.

16. The non-transitory machine-readable storage medium of claim 15, wherein the plurality of authentication credentials specify a proof of identity for a user or access permissions for the user to access the resources of the network.

17. The non-transitory machine-readable storage medium of claim 16, wherein the processing device is further to:
- transmit, after decoding the encrypted file, a first authentication credential of the plurality of authentication credentials to access a first resource of the resources.

18. The non-transitory machine-readable storage medium of claim 17, wherein the access of the encrypted file is in response to a request for user authentication credentials from the first resource, and wherein a subsequent access of the same encrypted file is in response to a request for user authentication credentials from a second resource of the plurality of resources of the network, the processing device is further to:
- identify, from the plurality of authentication credentials, a second authentication credential from the plurality of authentication credentials that corresponds to the second resource; and
- transmit the second authentication credential of the plurality of authentication credentials to access the second resource.

19. The non-transitory machine-readable storage medium of claim 15, the processing device is further to:
- transmit authentication information identifying a user to an authentication server, wherein the authentication data is received from the authentication server in response to a verification of the authentication information.

20. The non-transitory machine-readable storage medium of claim 15, wherein an operating system is associated with the kernel space and one or more applications are stored in the user space, the applications do not have access permissions to the kernel space and the operating system has access permissions to the kernel space and the user space.

* * * * *